A. Densmore,
Bath.
N°. 1,866.    Patented Nov. 26, 1840.
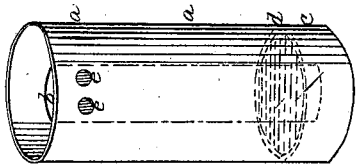
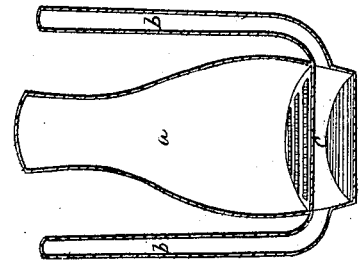

UNITED STATES PATENT OFFICE.

RANDOLPH DENSMORE, OF HOPEWELL, NEW YORK.

CONSTRUCTION OF PORTABLE FURNACES FOR HEATING WATER IN BATHING-TUBS.

Specification of Letters Patent No. 1,866, dated November 26, 1840.

*To all whom it may concern:*

Be it known that I, RANDOLPH DENSMORE, of Hopewell, in the county of Ontario and State of New York, have made an Improvement in the Manner of Constructing Furnaces for Heating Baths; and I do hereby declare that the following is a full and exact description thereof.

The kind of furnace which I have improved is that which is so constructed as to float in the water contained in the bathing-tub, and in which the burning charcoal is below its surface, the fire being fed with air through two tubes branching out from each side of the ash pit, as shown in Figure 1, in the accompanying drawing, which is a vertical section through a furnace of this kind; in this figure, $a$, is the body of the furnace; $b$, $b$, the air flues leading into the ash pit $c$; and $d$, is the grate upon which the fuel rests.

In my improved furnace, I, in general, make the body thereof cylindrical, and I construct my air flue, or flues, in such manner as that they shall be contained within said cylindrical body; by which arrangement it is rendered much more convenient in use, and can be afforded at half the cost of those on the old construction.

Fig. 2, is a perspective representation of my improved furnace. $a$, $a$, is the cylindrical body of the furnace; $b$, is a semi-cylindrical, or other formed, tube, descending, as shown by the dotted lines, into the ash pit $c$, below the grate bars $d$. The top of this tube at $b$, may be closed to prevent the entrance of dust, and a hole, or holes, be made into it at $e$, $e$, through the side of the furnace for the admission of air. There may be a similar tube on the opposite side, but one will answer every useful purpose.

Having thus fully described the nature of my improvement, and shown the manner in which I carry the same into operation, what I claim therein as constituting my invention, and desire to secure by Letters Patent, is—

The giving to the body of the furnace for the heating of baths, a cylindrical form, and placing the tube, or tubes, channel, or channels, through which air is supplied to the fire, within said body, in the manner and for the purpose herein set forth; and it is to be understood that although I have mentioned a cylindrical form only, as given to the furnace body, I do not intend thereby to limit myself to this particular shape, as the body may be made oval, or polygonal, or be otherwise varied in form, while the instrument will remain substantially the same in all its essential characteristics.

RANDOLPH DENSMORE.

Witnesses:
R. HOGARTH,
AARON YOUNG.